US012783145B2

(12) United States Patent
Zang

(10) Patent No.: US 12,783,145 B2
(45) Date of Patent: Nov. 3, 2026

(54) METADATA LOAD BALANCING METHOD, APPARATUS, AND DEVICE, AND NON-VOLATILE READABLE STORAGE MEDIUM

(71) Applicant: IEIT SYSTEMS Co., Ltd., Jinan (CN)

(72) Inventor: Linjie Zang, Jinan (CN)

(73) Assignee: IEIT SYSTEMS CO., LTD., Jinan Shandong (CN)

( * ) Notice: Subject to any disclaimer, the term of this patent is extended or adjusted under 35 U.S.C. 154(b) by 0 days.

(21) Appl. No.: 19/155,413

(22) PCT Filed: Feb. 8, 2024

(86) PCT No.: PCT/CN2024/076962

§ 371 (c)(1),
(2) Date: Aug. 11, 2025

(87) PCT Pub. No.: WO2024/174920

PCT Pub. Date: Aug. 29, 2024

(65) Prior Publication Data

US 2026/0119069 A1 Apr. 30, 2026

(30) Foreign Application Priority Data

Feb. 24, 2023 (CN) ......................... 202310161610.9

(51) Int. Cl.
*G06F 3/00* (2006.01)
*G06F 3/06* (2006.01)
*G06F 12/00* (2006.01)

(52) U.S. Cl.
CPC .......... *G06F 3/0647* (2013.01); *G06F 3/0613* (2013.01); *G06F 3/067* (2013.01)

(58) Field of Classification Search
CPC ......... G06F 3/0647; G06F 3/0613; G06F 3/06
(Continued)

(56) References Cited

U.S. PATENT DOCUMENTS 6,990,667 B2 * 1/2006 Ulrich ..................... G06F 16/10 711/170
7,523,286 B2 * 4/2009 Ramany ................ G06F 3/0653 711/170

(Continued)

FOREIGN PATENT DOCUMENTS

CN 102523158 A 6/2012
CN 103279568 A 9/2013

(Continued)

OTHER PUBLICATIONS

International Search Report of corresponding PCT application (PCT/CN2024/076962) Apr. 28, 2024, 7 pages.

(Continued)

*Primary Examiner* — Sheng Jen Tsai
(74) *Attorney, Agent, or Firm* — COOPER LEGAL GROUP LLC

(57) ABSTRACT

The present application discloses a metadata load balancing method, apparatus and device, and a non-volatile readable storage medium, relating to the technical field of distributed storage. The method includes: acquiring metadata load pressure information corresponding to respective metadata services in a distributed file storage cluster; determining a metadata migration time, target metadata services scheduled for metadata migration, and a quantity of to-be-migrated metadata between the target metadata services according to the metadata load pressure information; acquiring migration parameters corresponding to respective sub-tree partitions in the target metadata services; determining exporter sub-tree partitions and importer sub-tree partitions according to the migration parameters; and migrating metadata in the quantity of to-be-migrated metadata from the exporter sub-tree partitions to the importer sub-tree partitions when the metadata migration time arrives.

14 Claims, 6 Drawing Sheets

(58) Field of Classification Search
USPC .......................................................... 711/165
See application file for complete search history.

(56) References Cited

U.S. PATENT DOCUMENTS

| | | | | |
|---|---|---|---|---|
| 8,886,781 | B2 * | 11/2014 | Jain | G06F 16/1827 709/248 |
| 9,285,991 | B2 * | 3/2016 | Alatorre | G06F 3/067 |
| 9,417,968 | B2 * | 8/2016 | Dornemann | G06F 11/1458 |
| 9,436,555 | B2 * | 9/2016 | Dornemann | G06F 3/064 |
| 9,495,251 | B2 * | 11/2016 | Kottomtharayil | G06F 11/00 |
| 9,645,891 | B2 * | 5/2017 | Ahn | G06F 11/1451 |
| 10,140,312 | B2 * | 11/2018 | Strauss | G06F 16/119 |
| 10,275,489 | B1 * | 4/2019 | Muniswamy Reddy | G06F 16/2453 |
| 10,503,753 | B2 * | 12/2019 | Mitkar | G06F 16/275 |
| 10,552,058 | B1 * | 2/2020 | Jadon | G06F 3/0656 |
| 10,721,181 | B1 * | 7/2020 | Greenwood | H04L 43/0876 |
| 10,817,497 | B2 * | 10/2020 | Zaslavsky | G06F 16/27 |
| 10,896,160 | B2 * | 1/2021 | Denyer | G06F 16/252 |
| 10,909,094 | B1 * | 2/2021 | Kumar | G06F 16/27 |
| 11,321,189 | B2 * | 5/2022 | Klose | G06F 11/1464 |
| 11,500,669 | B2 * | 11/2022 | Kumar | G06F 11/2033 |
| 11,579,981 | B2 * | 2/2023 | Vig | G06F 11/1451 |
| 11,586,385 | B1 * | 2/2023 | Lercari | G06F 12/0246 |
| 11,755,415 | B2 * | 9/2023 | Madhavarapu | G06F 11/2097 707/634 |
| 11,860,741 | B2 * | 1/2024 | Vig | G06F 16/278 |
| 12,028,240 | B2 * | 7/2024 | Lin | H04L 45/122 |
| 2002/0124137 | A1 * | 9/2002 | Ulrich | G06F 3/064 714/E11.034 |
| 2006/0159109 | A1 * | 7/2006 | Lamkin | H04L 67/10 707/E17.032 |
| 2009/0271412 | A1 * | 10/2009 | Lacapra | G06F 16/178 |
| 2011/0010518 | A1 * | 1/2011 | Kavuri | G06F 3/0647 711/170 |
| 2012/0191900 | A1 * | 7/2012 | Kunimatsu | G06F 3/0638 711/E12.008 |
| 2013/0151683 | A1 * | 6/2013 | Jain | G06F 3/0611 709/223 |
| 2015/0106578 | A1 * | 4/2015 | Warfield | G06F 3/0653 711/158 |
| 2015/0199367 | A1 * | 7/2015 | Hammer | G06F 16/1748 707/654 |
| 2016/0162374 | A1 * | 6/2016 | Mutha | G06F 11/3409 714/19 |
| 2017/0077950 | A1 * | 3/2017 | Pavlov | G06F 3/0647 |
| 2020/0026643 | A1 * | 1/2020 | Tai | G06F 12/0215 |
| 2021/0289217 | A1 * | 9/2021 | Yashima | H04N 19/13 |
| 2022/0092024 | A1 * | 3/2022 | Kavaipatti Anantharamakrishnan | G06F 16/182 |
| 2022/0269418 | A1 * | 8/2022 | Black | G06F 3/064 |
| 2022/0365827 | A1 * | 11/2022 | Darji | G06F 3/0653 |
| 2022/0391120 | A1 * | 12/2022 | Chandrasekaran | G06F 9/45512 |
| 2023/0236767 | A1 * | 7/2023 | Karr | G06F 3/067 711/100 |
| 2023/0367479 | A1 * | 11/2023 | Colgrove | G06F 3/0608 |
| 2024/0232132 | A9 * | 7/2024 | Rogers | G06F 16/125 |
| 2024/0261692 | A1 * | 8/2024 | Sliwka | H04L 9/3213 |
| 2024/0346087 | A1 * | 10/2024 | Quigley | G06F 16/22 |
| 2024/0370410 | A1 * | 11/2024 | Dronamraju | G06F 11/2023 |
| 2024/0427645 | A1 * | 12/2024 | Darji | G06F 11/3034 |
| 2024/0428306 | A1 * | 12/2024 | Sliwka | H04L 9/0891 |
| 2025/0047663 | A1 * | 2/2025 | Brennan | H04L 67/141 |
| 2025/0156828 | A1 * | 5/2025 | Sliwka | H04L 9/3247 |

FOREIGN PATENT DOCUMENTS

| | | | |
|---|---|---|---|
| CN | 103744882 | A | 4/2014 |
| CN | 106034080 | A | 10/2016 |
| CN | 106598744 | A | 4/2017 |
| CN | 107145307 | A | 9/2017 |
| CN | 107239569 | A | 10/2017 |
| CN | 111338801 | A | 6/2020 |
| CN | 111459407 | A | 7/2020 |
| CN | 111666159 | A | 9/2020 |
| CN | 112256438 | A | 1/2021 |
| CN | 112711461 | A | 4/2021 |
| CN | 115563073 | A | 1/2023 |
| CN | 115952005 | A | 4/2023 |
| WO | 2018236429 | A1 | 12/2018 |
| WO | 2022063322 | A1 | 3/2022 |

OTHER PUBLICATIONS

Written Opinion of International Searching Authority of corresponding PCT application (PCT/CN2024/076962) Apr. 28, 2024, 7 pages.

First Office Action of corresponding CN priority application (CN202310161610.9) Apr. 18, 2023, 14 pages.

She, et al., “Adaptive Load Balancing Strategy for File-System Metadata Service”, Journal of Software, 2017, 28 (8):1952-1967, Jan. 12, 2017, with English abstract, 16 pages.

Meng An-tai, “Study of Metadata Management Mechanism in Distributed File System”, Computer Knowledge and Technology, vol. 7, No. 35, Dec. 15, 2011, with English abstract, 3 pages.

Singh et al., “LaMeta: An efficient locality aware metadata management technique for an ultra-large distributed storage system”, «Computer and Information Science)»,Aug. 23, 2022, 13 pages.

* cited by examiner

METADATA LOAD BALANCING METHOD, APPARATUS, AND DEVICE, AND NON-VOLATILE READABLE STORAGE MEDIUM

CROSS-REFERENCE TO RELATED APPLICATION

This application claims priority to Chinese Patent Application No. 202310161610.9, filed on Feb. 24, 2023 in China National Intellectual Property Administration and entitled "Metadata Load Balancing Method, Apparatus and Device, and Readable Storage Medium", which is hereby incorporated by reference in its entirety.

FIELD

The present application relates to the technical field of distributed storage, and in particular to a metadata load balancing method, apparatus, and device, and a non-volatile readable storage medium.

BACKGROUND

Distributed file storage systems have been widely used in many key fields such as big data service computing. In the distributed file storage systems, metadata and data are managed separately. This decoupling method supports the independence of metadata and data. Different non-volatile readable storage media such as NVMeSSDs (NVM Express Solid State Disks) are used to store metadata, while HDDs (Hard Disk Drives) are used to store data. In this architecture, metadata must be obtained first before actual data access is performed. Recent research has shown that the workloads of many file systems are metadata-intensive, with over 60% of file system operations concentrated on metadata. In addition, most files are small, with a high proportion of bytes, unbalanced metadata request pressure, and intensive metadata access, which are important reasons for the performance bottleneck of file system services. All of these trends make metadata load balance crucial.

In order to improve mass metadata access performance of distributed file systems, it is challenging to expand and improve the performance of distributed MDS (Metadata Server) clusters. This challenge is mainly due to the fact that metadata contains file system structure information and exhibits a higher degree of interdependence. Currently, dynamic sub-tree partitioning is commonly used to decompose a directory of a file system into several sub-directories, which are then dynamically adjusted based on file access popularity. Dynamic adjustment refers to migration between a plurality of metadata services. This method improves metadata extension characteristics by splitting and distributing sub-trees among a plurality of metadata services in a hierarchical name space manner. However, this method incurs serious imbalances, such as imbalanced distributed metadata services and inaccurate predictions. The reason is that the method has low recognition of service load characteristics and is prone to unnecessary and invalid migration of metadata, resulting in poor performance of distributed file systems.

In related technologies, no effective solutions have been provided for the problem of poor performance of distributed file systems due to the fact that the metadata load balancing methods have low recognition of service load characteristics and are prone to unnecessary and invalid migration of metadata.

SUMMARY

An objective of the present application is to provide a metadata load balancing method, which improves recognition of service load characteristics, greatly reduces the probability of unnecessary and invalid migration of metadata, has good metadata load balancing characteristics, and improves the stability of a distributed storage system. Another objective of the present application is to provide a metadata load balancing apparatus and device, and a computer non-volatile readable storage medium.

To solve the above technical problems, according to a first aspect, the present application provides a metadata load balancing method, including:

acquiring metadata load pressure information corresponding to respective metadata services in a distributed file storage cluster;

determining a metadata migration time, target metadata services scheduled for metadata migration, and a quantity of to-be-migrated metadata between the target metadata services according to the metadata load pressure information;

acquiring migration parameters corresponding to respective sub-tree partitions in the target metadata services;

determining exporter sub-tree partitions and importer sub-tree partitions according to the migration parameters; and migrating metadata in the quantity of to-be-migrated metadata from the exporter sub-tree partitions to the importer sub-tree partitions when the metadata migration time arrives.

In an optional implementation of the present application, the acquiring metadata load pressure information corresponding to respective metadata services in a distributed file storage cluster includes:

acquiring the metadata load pressure information corresponding to the respective metadata services through load monitors deployed in the metadata services of the distributed file storage cluster.

In an optional implementation of the present application, the determining a metadata migration time, target metadata services scheduled for metadata migration, and a quantity of to-be-migrated metadata between the target metadata services according to the metadata load pressure information includes:

determining the metadata migration time, the target metadata services scheduled for metadata migration, and the quantity of to-be-migrated metadata between the target metadata services according to the metadata load pressure information through a metadata migration initiator set in a pre-selected metadata service.

In an optional implementation of the present application, the acquiring migration parameters corresponding to respective sub-tree partitions in the target metadata services includes:

acquiring the migration parameters corresponding to the respective sub-tree partitions in the target metadata services through load analysis components deployed in the metadata services; and the determining exporter sub-tree partitions and importer sub-tree partitions according to the migration parameters includes:

determining the exporter sub-tree partitions and the importer sub-tree partitions according to the migration parameters through sub-tree selection components deployed in the metadata services.

In an optional implementation of the present application, the acquiring the migration parameters corresponding to the respective sub-tree partitions in the target metadata services through load analysis components deployed in the metadata services includes:

acquiring the migration parameters corresponding to the respective sub-tree partitions in the target metadata services and a workload I/O mode of the distributed file storage cluster through the load analysis components deployed in the metadata services; and the determining the exporter sub-tree partitions and the importer sub-tree partitions according to the migration parameters through sub-tree selection components deployed in the metadata services includes:

when determining that the workload I/O mode is metadata intensive IO, determining the exporter sub-tree partitions and the importer sub-tree partitions according to the migration parameters through the sub-tree selection components deployed in the metadata services.

In an optional implementation of the present application, the acquiring the migration parameters corresponding to the respective sub-tree partitions in the target metadata services through load analysis components deployed in the metadata services includes:

collecting statistics on historical workloads corresponding to the respective sub-tree partitions through the load analysis components deployed in the metadata services;

determining metadata access differences of the sub-tree partitions according to the historical workloads; and determining the migration parameters corresponding to the respective sub-tree partitions according to the metadata access differences.

In an optional implementation of the present application, the determining the migration parameters corresponding to the respective sub-tree partitions according to the metadata access differences includes:

acquiring a preset maximum metadata throughput; and when determining that a historical workload greater than the maximum metadata throughput exists, determining the migration parameters corresponding to the respective sub-tree partitions according to the metadata access differences.

In an optional implementation of the present application, after the determining the exporter sub-tree partitions and the importer sub-tree partitions according to the migration parameters, the method further includes:

when a historical metadata access request table that reflects spatial locality exists among historical metadata access request tables maintained in the metadata services, selecting target sub-tree partitions from the sub-tree partitions at same levels as the exporter sub-tree partitions; and increasing the migration parameters of the target sub-tree partitions by a preset value.

In an optional implementation of the present application, the acquiring metadata load pressure information corresponding to respective metadata services in a distributed file storage cluster includes:

acquiring a number of metadata requests processed per unit duration corresponding to the respective metadata services in the distributed file storage cluster; and determining the metadata load pressure information corresponding to the respective metadata services according to the number of metadata requests processed per unit duration corresponding to the respective metadata services.

In an optional implementation of the present application, the determining the metadata load pressure information corresponding to the respective metadata services according to the number of metadata requests processed per unit duration corresponding to the respective metadata services includes:

determining the metadata load pressure information corresponding to the respective metadata services according to a statistical number of metadata requests processed per unit duration corresponding to the respective metadata services within a preset duration.

In an optional implementation of the present application, the determining a metadata migration time, target metadata services scheduled for metadata migration, and a quantity of to-be-migrated metadata between the target metadata services according to the metadata load pressure information includes:

determining metadata load balance values corresponding to the respective metadata services according to the metadata load pressure information; and determining the metadata migration time, the target metadata services scheduled for metadata migration, and the quantity of to-be-migrated metadata between the target metadata services according to the metadata load balance values.

In an optional implementation of the present application, the determining the metadata migration time, the target metadata services scheduled for metadata migration, and the quantity of to-be-migrated metadata between the target metadata services according to the metadata load balance values includes:

determining whether a metadata load balance value that exceeds a preset threshold exists; and when the metadata load balance value that exceeds the preset threshold exists, performing the step of determining the metadata migration time, the target metadata services scheduled for metadata migration, and the quantity of to-be-migrated metadata between the target metadata services according to the metadata load balance values.

In an optional implementation of the present application, the determining a metadata migration time, target metadata services scheduled for metadata migration, and a quantity of to-be-migrated metadata between the target metadata services according to the metadata load pressure information includes:

obtaining load differences that the respective metadata services tolerate; and determining the metadata migration time, the target metadata services scheduled for metadata migration, and the quantity of to-be-migrated metadata between the target metadata services by combining the metadata load pressure information and the load differences.

In an optional implementation of the present application, the acquiring metadata load pressure information corresponding to respective metadata services in a distributed file storage cluster includes:

acquiring a number of input/output operations per second performed by the metadata services in the distributed file storage cluster, respectively; and determining the metadata load pressure information corresponding to the respective metadata services according to the number of input/output operations per second performed by the metadata services.

In an optional implementation of the present application, the determining the exporter sub-tree partitions and the importer sub-tree partitions according to the migration parameters includes:

sorting the sub-tree partitions according to the migration parameters to obtain sorting results; and selecting, according to the sorting results, a first preset quantity of sub-tree partitions from an end with large migration parameters as the exporter sub-tree partitions, and a second preset quantity of sub-tree partitions from an end with small migration parameters as the importer sub-tree partitions.

In an optional implementation of the present application, after the selecting, according to the sorting results, a first preset quantity of sub-tree partitions from an end with large migration parameters as the exporter sub-tree partitions, the method further includes:

determining remaining sub-tree partitions, except for the exporter sub-tree partitions, as invalid migration candidates.

In an optional implementation of the present application, the selecting a second preset quantity of sub-tree partitions from an end with small migration parameters as the importer sub-tree partitions includes:

counting a quantity of sub-tree partitions with spare capacities greater than or equal to a preset capacity value among the sub-tree partitions;

when the quantity of sub-tree partitions with spare capacities greater than or equal to the preset capacity value is greater than or equal to the second preset quantity, selecting the second preset quantity of sub-tree partitions from the end with small migration parameters as the importer sub-tree partitions; and when the quantity of sub-tree partitions with spare capacities greater than or equal to the preset capacity value is less than the second preset quantity, determining the sub-tree partitions with spare capacities greater than or equal to the preset capacity value as the importer sub-tree partitions.

According to a second aspect, the present application provides a metadata load balancing apparatus, including:

a load pressure acquisition module, configured to acquire metadata load pressure information corresponding to respective metadata services in a distributed file storage cluster;

a migration information determination module, configured to determine a metadata migration time, target metadata services scheduled for metadata migration, and a quantity of to-be-migrated metadata between the target metadata services according to the metadata load pressure information;

a migration parameter acquisition module, configured to acquire migration parameters corresponding to respective sub-tree partitions in the target metadata services;

a sub-tree partition determination module, configured to determine exporter sub-tree partitions and importer sub-tree partitions according to the migration parameters; and a metadata migration module, configured to migrate metadata in the quantity of to-be-migrated metadata from the exporter sub-tree partitions to the importer sub-tree partitions when the metadata migration time arrives.

According to a third aspect, the present application provides a metadata load balancing device, including:

a memory, configured to store a computer program; and a processor, configured to implement the steps of the foregoing metadata load balancing method when executing the computer program.

According to a fourth aspect, the present application provides a computer non-volatile readable storage medium, storing a computer program that, when executed by a processor, implements the steps of the foregoing metadata load balancing method.

The metadata load balancing method provided in the present application includes: acquiring the metadata load pressure information corresponding to the respective metadata services in the distributed file storage cluster; determining the metadata migration time, the target metadata services scheduled for metadata migration, and the quantity of to-be-migrated metadata between the target metadata services according to the metadata load pressure information; acquiring the migration parameters corresponding to the respective sub-tree partitions in the target metadata services; determining the exporter sub-tree partitions and the importer sub-tree partitions according to the migration parameters; and migrating the metadata in the quantity of to-be-migrated metadata from the exporter sub-tree partitions to the importer sub-tree partitions when the metadata migration time arrives.

As can be seen from the above technical solution, the metadata migration time, the target metadata services scheduled for metadata migration, and the quantity of to-be-migrated metadata between the target metadata services are accurately determined according to the acquired metadata load pressure information corresponding to the respective metadata services, and the exporter sub-tree partitions and the importer sub-tree partitions are accurately determined according to the migration parameters corresponding to the respective sub-tree partitions in the target metadata services, thereby achieving accurate migration of metadata, improving the recognition of service load characteristics, greatly reducing the probability of unnecessary and invalid migration of metadata, effectively increasing metadata throughput, eliminating the performance bottleneck caused by metadata in high-concurrency metadata intensive file system services, achieving good metadata load balancing characteristics, and improving the stability of a distributed storage system.

Correspondingly, the present application further provides the metadata load balancing apparatus and device, and the computer non-volatile readable storage medium corresponding to the foregoing metadata load balancing method, which have the above technical effects and will not be repeated herein.

BRIEF DESCRIPTION OF THE DRAWINGS

In order to describe the technical solutions in the embodiments of the present application or in related technologies more clearly, drawings required to be used in the illustration of the embodiments or the related technologies will be briefly introduced below. Apparently, the drawings in the illustration below are only some embodiments of the present application. Those ordinarily skilled in the art also can obtain other drawings according to the provided drawings without creative work.

DETAILED DESCRIPTION

In order to make those skilled in the art better understand solutions of the present application, the present application will be explained below in conjunction with the accompanying drawings and optional embodiments. Obviously, the described embodiments are only a part of the embodiments of the present application, rather than all the embodiments. Based on the embodiments of the present application, all other embodiments obtained by those ordinarily skilled in the art without creative work shall fall within the scope of protection of the present application.

Figure 1:
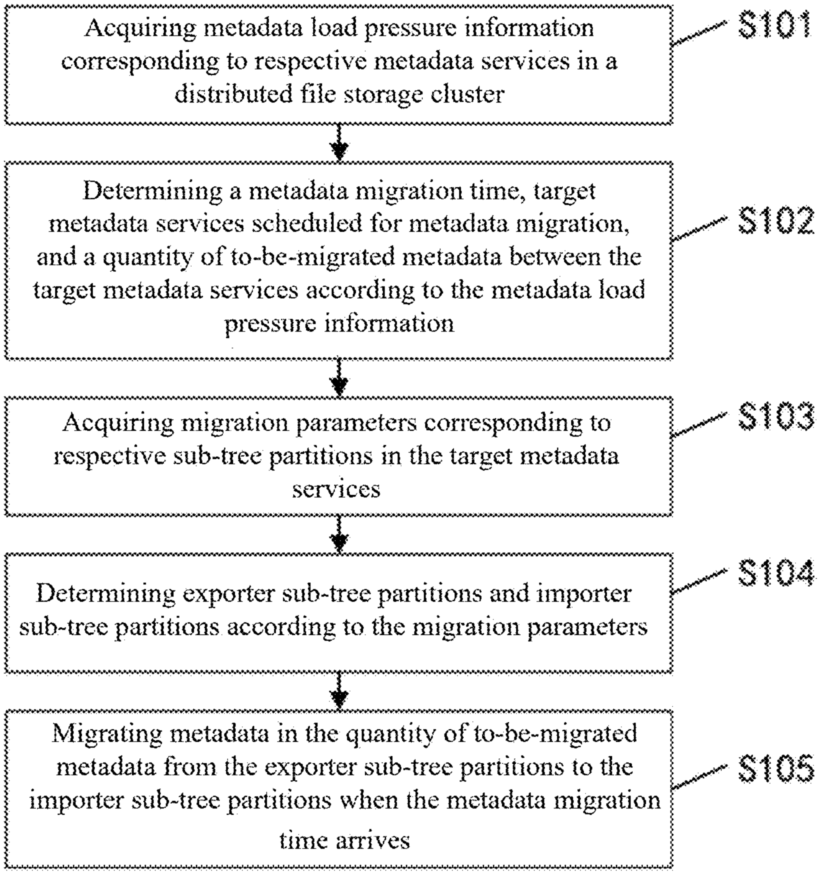
FIG. 1 is an implementation flowchart of a metadata load balancing method according to an embodiment of the present application.

Refer to FIG. 1. FIG. 1 is an implementation flowchart of a metadata load balancing method according to an embodiment of the present application. The method may include the following steps:

S101: acquiring metadata load pressure information corresponding to respective metadata services in a distributed file storage cluster.

Metadata load pressure of each metadata service in the distributed file storage cluster is pre-monitored to acquire the metadata load pressure information corresponding to the respective metadata services in the distributed file storage cluster, for example, the quantity of metadata requests of each metadata service per unit duration or in a preset duration is monitored.

In an optional implementation of the present application, step S101 may include the following steps:

- Step 1: acquiring a number of metadata requests processed per unit duration corresponding to the respective metadata services in the distributed file storage cluster.
- Step 2: determining the metadata load pressure information corresponding to the respective metadata services according to the number of metadata requests processed per unit duration corresponding to the respective metadata services.

For ease of description, the above two steps may be combined for explanation.

The number of metadata requests processed by each metadata service in the distributed file storage cluster per unit duration is pre-monitored to acquire the number of metadata requests processed per unit duration corresponding to the respective metadata services in the distributed file storage cluster, for example, the number of metadata requests processed by each metadata service per second is counted, and the metadata load pressure information corresponding to the respective metadata services is determined according to the number of metadata requests processed per unit duration corresponding to the respective metadata services. By determining the metadata load pressure information corresponding to the respective metadata services according to the number of metadata requests processed by each metadata service per unit duration, the accuracy of metadata load pressure statistics for the metadata services is improved.

In an optional implementation of the present application, the determining the metadata load pressure information corresponding to the respective metadata services according to the number of metadata requests processed per unit duration corresponding to the respective metadata services may include the following steps:

- determining the metadata load pressure information corresponding to the respective metadata services according to the statistical number of metadata requests processed per unit duration corresponding to the respective metadata services within a preset duration.

Metadata load pressure of each metadata service is determined by monitoring the number of metadata requests processed per unit duration corresponding to the respective metadata services by statistics within the preset duration, for example, metadata load pressure of each metadata service may be determined by monitoring the number of metadata requests processed by each metadata service per second within 10 consecutive seconds. By determining the metadata load pressure of each metadata service according to the collected number of metadata requests processed by each metadata service per unit duration within a continuous duration, such as taking a mean value of 10 times of metadata requests of each metadata service counted within 10 seconds as the metadata load pressure of each metadata service, the probability of inaccurate metadata load pressure assessment caused by occasional fluctuations in the number of metadata requests is reduced, and the accuracy of metadata load pressure assessment is improved.

In an optional implementation of the present application, step S101 may include the following steps:

- Step 1: acquiring a number of input/output operations per second performed by the metadata services in the distributed file storage cluster, respectively.
- Step 2: determining the metadata load pressure information corresponding to the respective metadata services according to the number of input/output operations per second performed by the metadata services.

For ease of description, the above two steps may be combined for explanation.

The metadata load pressure of each metadata service is recorded by counting the number of input/output operations per second (IOPS) performed by the metadata service. The number of input/output operations per second performed by the metadata services in the distributed file storage cluster is acquired respectively, and the metadata load pressure information corresponding to the respective metadata services is determined according to the number of input/output operations per second performed by the metadata services. The number of input/output operations per second performed by each metadata services is used as a main indicator to estimate the busyness of the metadata service, reflecting the real-time load of each metadata service. For example, the metadata load pressure information corresponding to the respective metadata services can be determined by counting the number of input/output operations per second within a period of time, thereby improving the accuracy of metadata load pressure assessment.

S102: determining a metadata migration time, target metadata services scheduled for metadata migration, and a quantity of to-be-migrated metadata between the target metadata services according to the metadata load pressure information.

After the metadata load pressure information corresponding to the respective metadata services in the distributed file storage cluster is acquired, the metadata migration time, the target metadata services scheduled for metadata migration, and the quantity of to-be-migrated metadata between the target metadata services are determined according to the metadata load pressure information. By accurately determining when to attempt a re-balancing process and making a right decision about the load capacity of migration, the frequency of migration is reduced and resource load waste caused by long-term migration is avoided.

In an optional implementation of the present application, step S102 may include the following steps:

Step 1: determining metadata load balance values corresponding to the respective metadata services according to the metadata load pressure information.

Step 2: determining the metadata migration time, the target metadata services scheduled for metadata migration, and the quantity of to-be-migrated metadata between the target metadata services according to the metadata load balance values.

For ease of description, the above two steps may be combined for explanation.

The metadata load balance values (LBVs) corresponding to the respective metadata services are determined according to the metadata load pressure information, where the metadata load balance value represents an intensity level of metadata load imbalance at each time interval (default 10 seconds); and the metadata migration time, the target metadata services scheduled for metadata migration, and the quantity of to-be-migrated metadata between the target metadata services according to the metadata load balance values. The metadata load balance value accurately counts load balances in each metadata service, thereby improving the accuracy of estimating the metadata migration time, the target metadata services scheduled for metadata migration, and the quantity of to-be-migrated metadata between the target metadata services.

In an optional implementation of the present application, the determining the metadata migration time, determining the metadata migration time, the target metadata services scheduled for metadata migration, and the quantity of to-be-migrated metadata between the target metadata services according to the metadata load balance values may include the following steps:

Step 1: determining whether a metadata load balance value that exceeds a preset threshold exists, and if so, performing step 2, otherwise, performing no processing.

Step 2: determining the metadata migration time, the target metadata services scheduled for metadata migration, and the quantity of to-be-migrated metadata between the target metadata services according to the metadata load balance values.

For ease of description, the above two steps may be combined for explanation.

According to the statistical load of each metadata service, not all imbalances require a load re-balancing process. A metadata load balance threshold is preset. After the metadata load balance values corresponding to the respective metadata services are determined according to the metadata load pressure information, whether a metadata load balance value that exceeds the preset threshold is determined exists, and if so, the load re-balancing process is triggered and a migration plan is generated, where the plan allocates exporter metadata services (exporter MDSs) and importer metadata services (importer MDSs) to a metadata cluster. The metadata migration time, the target metadata services scheduled for metadata migration, and the quantity of to-be-migrated metadata between the target metadata services are determined according to the metadata load balance values, and if the metadata load balance value that exceeds the preset threshold does not exist, the load re-balancing process is not triggered temporarily and no processing is performed.

In an optional implementation of the present application, step S102 may include the following steps:

Step 1: acquiring load differences that the respective metadata services tolerate.

Step 2: determining the metadata migration time, the target metadata services scheduled for metadata migration, and the quantity of to-be-migrated metadata between the target metadata services by combining the metadata load pressure information and the load differences.

For ease of description, the above two steps may be combined for explanation.

After the metadata load pressure information corresponding to the respective metadata services in the distributed file storage cluster is acquired, the load differences that the respective metadata services tolerate are acquired based on consideration, and the metadata migration time, the target metadata services scheduled for metadata migration, and the quantity of to-be-migrated metadata between the target metadata services are determined by combining the metadata load pressure information and the load differences. The quantity of to-be-migrated metadata between the target metadata services is determined by combining the load differences that the respective metadata services tolerate, thereby improving the accuracy of metadata migration.

S103: acquiring migration parameters corresponding to respective sub-tree partitions in the target metadata services.

Figure 2:
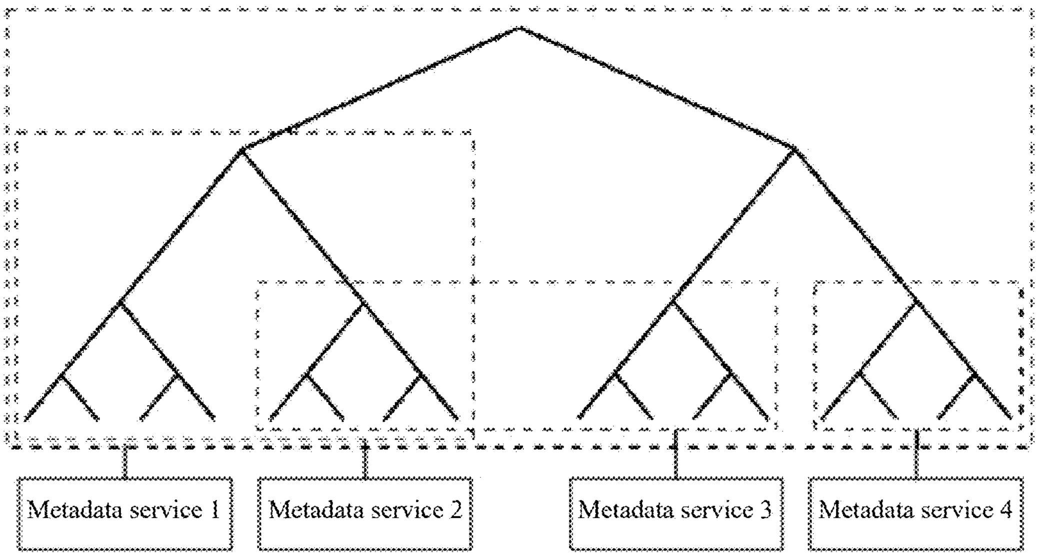
FIG. 2 is a schematic structural diagram of sub-tree partitions in distributed file storage metadata services according to an embodiment of the present application.

Refer to FIG. 2. FIG. 2 is a schematic structural diagram of sub-tree partitions in distributed file storage metadata services according to an embodiment of the present application. Each metadata service contains one or more sub-tree partitions. A load trend of metadata services is determined through migration parameters. The larger the migration parameter, the higher the probability that the corresponding sub-tree partition is migrated. The migration parameters corresponding to the respective sub-tree partitions in the target metadata services are acquired.

S104: determining exporter sub-tree partitions and importer sub-tree partitions according to the migration parameters.

After the migration parameters corresponding to the respective sub-tree partitions in the target metadata services are acquired, the sub-tree partition with a larger migration parameter transfers excess workload in the busy metadata service to the metadata service with lower load, and the exporter sub-tree partitions and the importer sub-tree partitions are determined according to the migration parameters.

In an optional implementation of the present application, after step S104, the method may include the following steps:

Step 1: when a historical metadata access request table that reflects spatial locality exists among historical metadata access request tables maintained in the metadata services, selecting target sub-tree partitions from the sub-tree partitions at same levels as the exporter sub-tree partitions.

Step 2: increasing the migration parameters of the target sub-tree partitions by a preset value.

For ease of description, the above two steps may be combined for explanation.

A historical metadata access request table is pre-maintained in each metadata service; when the historical metadata access request table that reflects spatial locality exists among the historical metadata access request tables maintained in the metadata services, the target sub-tree partitions are selected from the sub-tree partitions at the same levels as the exporter sub-tree partitions, that is, a strong access correlation exists between the sub-tree partitions at the same level; and the migration parameters of the target sub-tree partitions are increased by the preset value, for example, the migration parameters of the target sub-tree partitions are increased by 1, thereby reducing the impact of spatial locality and achieving accurate statistics on the migration parameters of sub-tree partitions.

In an optional implementation of the present application, step S104 may include the following steps:

Step 1: sorting the sub-tree partitions according to the migration parameters to obtain sorting results.

Step 2: selecting, according to the sorting results, a first preset quantity of sub-tree partitions from an end with large migration parameters as the exporter sub-tree partitions, and a second preset quantity of sub-tree partitions from an end with small migration parameters as the importer sub-tree partitions.

For ease of description, the above two steps can be combined for explanation.

After the migration parameters corresponding to the respective sub-tree partitions in the target metadata services are acquired, the sub-tree partitions are sorted according to the migration parameters to obtain the sorting results; and according to the sorting results, the first preset quantity of sub-tree partitions are selected from the end with large migration parameters as the exporter sub-tree partitions, and the second preset quantity of sub-tree partitions are selected from the end with small migration parameters as the importer sub-tree partitions. In this way, the sub-tree partition with the larger migration parameter transfers excess workload in the busy metadata service to the metadata service with less load. The process of importing and exporting a metadata cluster ensures data consistency and data security.

It should be noted that the first and the second in the first preset quantity and the second preset quantity are not distinguished in magnitude and order, but only distinguish the quantity of exporter sub-tree partitions and the quantity of importer sub-tree partitions, and the first preset quantity and the second preset quantity may be the same or different.

In an optional implementation of the present application, after selecting, according to the sorting results, a first preset quantity of sub-tree partitions from an end with large migration parameters as the exporter sub-tree partitions, the method may further include the following steps:

determining remaining sub-tree partitions, except for the exporter sub-tree partitions, as invalid migration candidates.

After the first preset quantity of sub-tree partitions are selected from the end with the large migration parameters according to the sorting results as the exporter sub-tree partitions, the remaining sub-tree partitions, except for the exporter sub-tree partitions, are determined as invalid migration candidates, thereby avoiding the invalid migration.

In an optional implementation of the present application, the selecting a second preset quantity of sub-tree partitions from an end with small migration parameters as the importer sub-tree partitions may include the following steps:

Step 1: counting a quantity of sub-tree partitions with spare capacities greater than or equal to a preset capacity value among the sub-tree partitions.

Step 2: when the quantity of sub-tree partitions with spare capacities greater than or equal to the preset capacity value is greater than or equal to the second preset quantity, selecting the second preset quantity of sub-tree partitions from the end with small migration parameters as the importer sub-tree partitions.

Step 3: when the quantity of sub-tree partitions with spare capacities greater than or equal to the preset capacity value is less than the second preset quantity, determining the sub-tree partitions with spare capacities greater than or equal to the preset capacity value as the importer sub-tree partitions.

For ease of description, the above three steps can be combined for explanation.

Considering that the importer sub-tree partitions are required to have certain spare capacities to accommodate introduced loads, the quantity of sub-tree partitions with spare capacities greater than or equal to the preset capacity value among the sub-tree partitions is counted; when the quantity of sub-tree partitions with spare capacities greater than or equal to the preset capacity value is greater than or equal to the second preset quantity, the second preset quantity of sub-tree partitions are selected from the end with small migration parameters as the importer sub-tree partitions; and when the quantity of sub-tree partitions with spare capacities greater than or equal to the preset capacity value is less than the second preset quantity, the sub-tree partitions with spare capacities greater than or equal to the preset capacity value are determined as the importer sub-tree partitions. The present application develops a metadata service sub-tree partition migration plan to select a reasonable quantity of sub-tree partitions as candidates of the importer sub-tree partitions, and to select the metadata services with lowest loads for migration, thereby ensuring that the selected importer sub-tree partitions meet capacity requirements and expanding the quantity of importer sub-tree partitions as much as possible. After a migration task arrives, a sub-tree selection component selects a suitable group of sub-tree partitions for metadata migration, thereby achieving an optimal metadata balance state of the distributed file storage cluster.

S105: migrating metadata in the quantity of to-be-migrated metadata from the exporter sub-tree partitions to the importer sub-tree partitions when the metadata migration time arrives.

After the metadata migration time, the quantity of to-be-migrated metadata, the exporter sub-tree partitions, and the importer sub-tree partitions are determined, when the metadata migration time arrives, the metadata in the quantity of to-be-migrated metadata is migrated from the exporter sub-tree partitions to the importer sub-tree partitions. By making a right decision on the load capacity of migration, the frequency of migration is reduced and resource load waste caused by long-term migration is avoided.

As can be seen from the above technical solution, the metadata migration time, the target metadata services scheduled for metadata migration, and the quantity of to-be-migrated metadata between the target metadata services are accurately determined according to the acquired metadata load pressure information corresponding to the respective metadata services, and the exporter sub-tree partitions and the importer sub-tree partitions are accurately determined according to the migration parameters corresponding to the respective sub-tree partitions in the target metadata services, thereby achieving accurate migration of metadata, improving the recognition of service load characteristics, greatly reducing the probability of unnecessary and invalid migration of metadata, effectively increasing metadata throughput, eliminating the performance bottleneck caused by metadata in high-concurrency metadata intensive file system services, achieving good metadata load balancing characteristics, and improving the stability of a distributed storage system.

It should be noted that, based on the above embodiments, the embodiments of the present application further provide corresponding improvement solutions. In the subsequent embodiments, the same steps or corresponding steps as those in the above embodiments can be mutually referenced, and the corresponding beneficial effects can also be mutually referenced. Such steps and beneficial effects will not be repeated one by one in the improved embodiments below.

Figure 3:
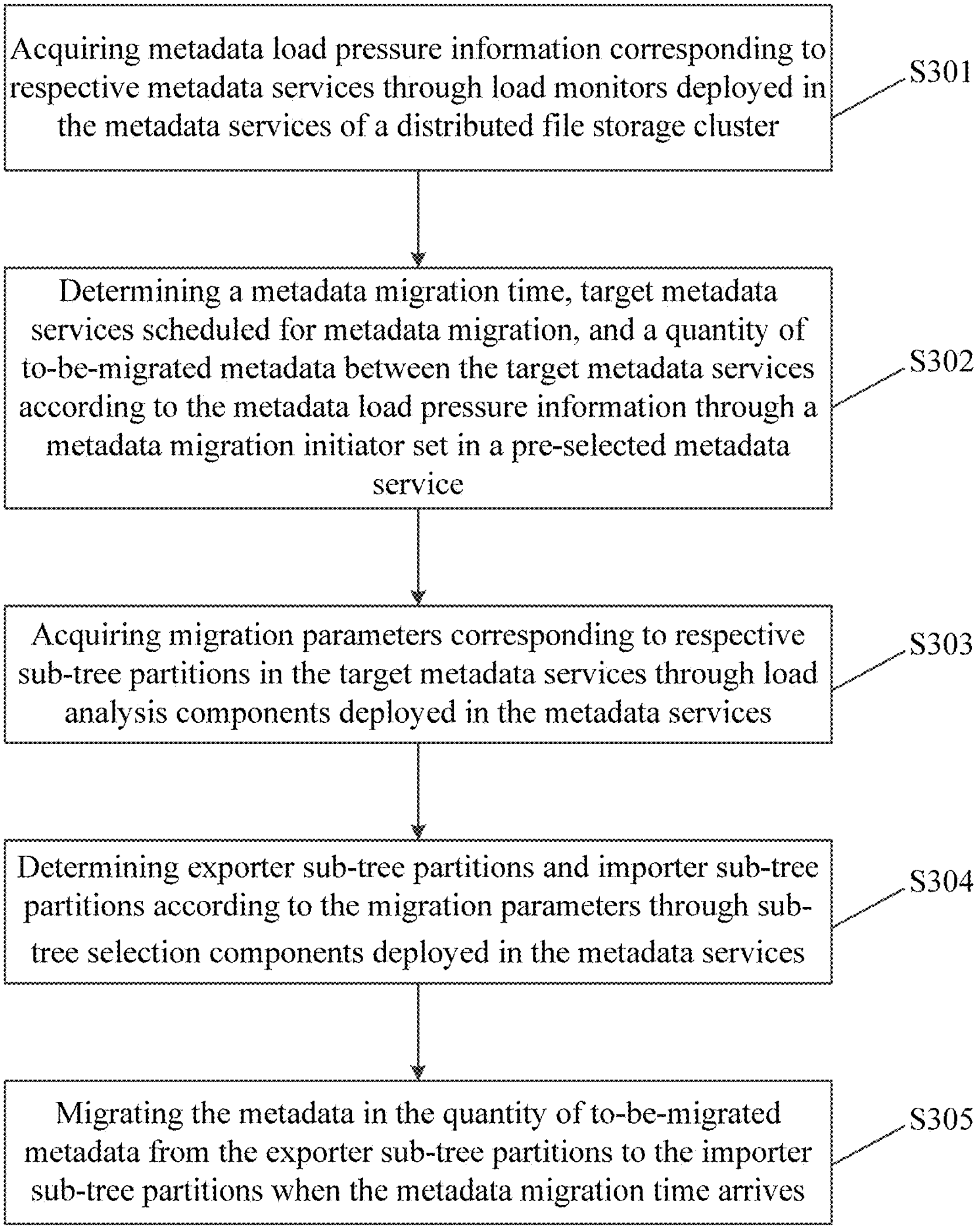
FIG. 3 is another implementation flowchart of a metadata load balancing method according to an embodiment of the present application.

Refer to FIG. 3. FIG. 3 is another implementation flowchart of a metadata load balancing method according to an embodiment of the present application. The method may include the following steps:

S301: acquiring metadata load pressure information corresponding to respective metadata services through load monitors deployed in the metadata services of a distributed file storage cluster.

Figure 4:
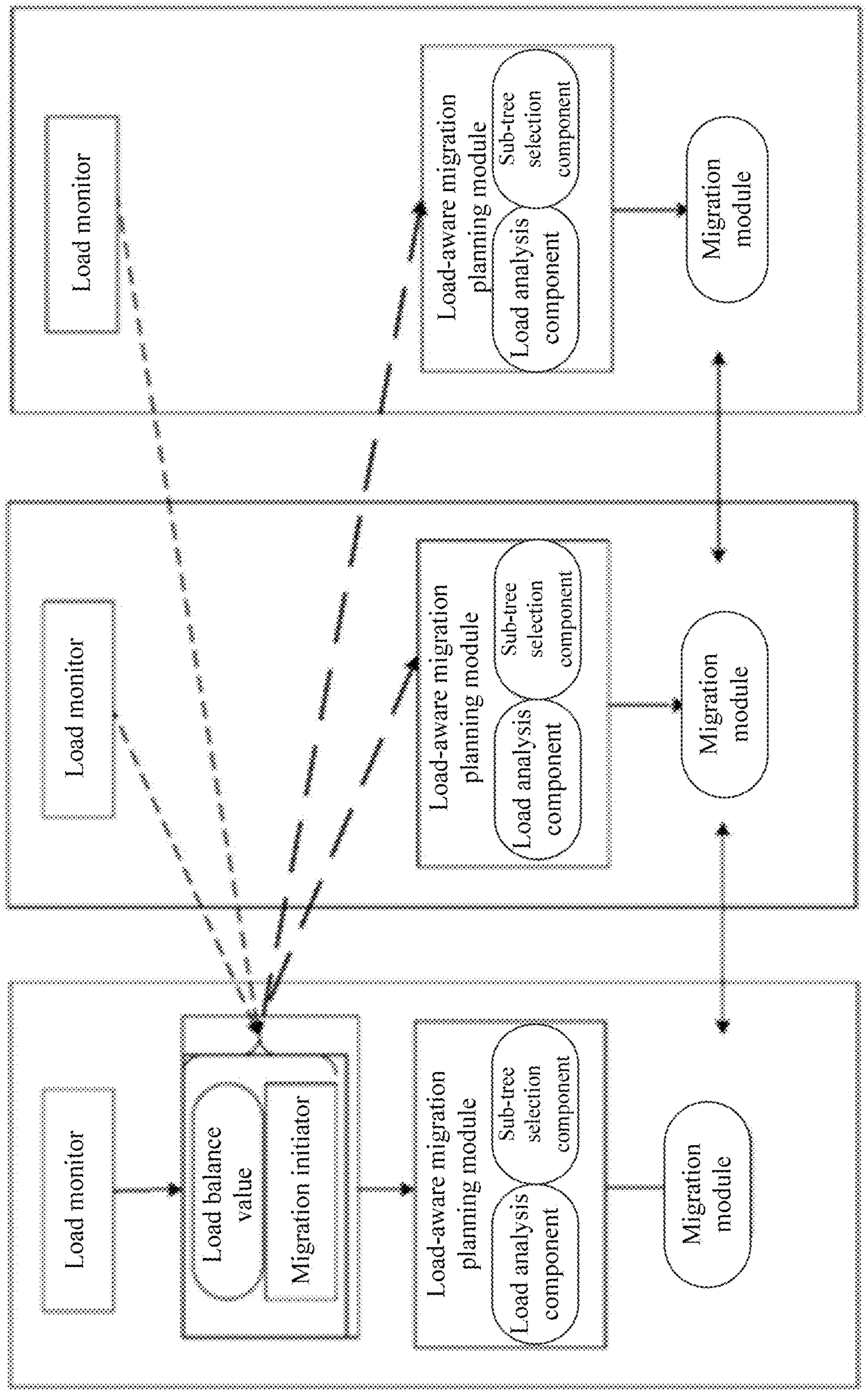
FIG. 4 is an architecture diagram of a metadata balancing method for distributed file storage according to an embodiment of the present application.

Refer to FIG. 4. FIG. 4 is an architecture diagram of a metadata balancing method for distributed file storage according to an embodiment of the present application. A load monitor is pre-deployed in each metadata service to monitor its metadata load pressure, and the metadata load pressure information corresponding to the respective metadata services is acquired through the load monitors deployed in the metadata services of the distributed file storage cluster.

S302: determining a metadata migration time, target metadata services scheduled for metadata migration, and a quantity of to-be-migrated metadata between the target metadata services according to the metadata load pressure information through a metadata migration initiator set in a pre-selected metadata service.

As shown in FIG. 4, a migration initiator is set in one of the metadata services of the distributed file storage system cluster to determine a time of migration and a quantity of metadata that should be exchanged between the metadata services. The metadata migration time, the target metadata services scheduled for metadata migration, and the quantity of to-be-migrated metadata between the target metadata services are determined according to the metadata load pressure information through the metadata migration initiator set in the pre-selected metadata service. The migration initiator of the present application is a single node component in the distributed file storage system, but it will not become a performance bottleneck because the migration process is carried out in a storage background, runs every time according to configuration parameters (configurable, default 10 seconds), and rarely consumes resources such as a CPU (Central Processing Unit), a memory, and a network bandwidth.

S303: acquiring migration parameters corresponding to respective sub-tree partitions in the target metadata services through load analysis components deployed in the metadata services.

As shown in FIG. 4, an independently running load-aware migration planning module is pre-deployed in each metadata service, the load-aware migration planning module includes the load analysis component, and the migration parameters corresponding to the respective sub-tree partitions in the target metadata services are acquired through the load analysis components deployed in the metadata services.

In an optional implementation of the present application, step S303 may include the following steps:

Step 1: collecting statistics on historical workloads corresponding to the respective sub-tree partitions through the load analysis components deployed in the metadata services.

Step 2: determining metadata access differences of the sub-tree partitions according to the historical workloads.

Step 3: determining the migration parameters corresponding to the respective sub-tree partitions according to the metadata access differences.

For ease of description, the above three steps can be combined for explanation.

The historical workloads corresponding to the respective sub-tree partitions are counted through the load analysis components deployed in the metadata services, the metadata access differences of the sub-tree partitions are determined according to the historical workloads, and the migration parameters corresponding to the respective sub-tree partitions are determined according to the metadata access differences. The impacts of the historical workloads are counted through the load analysis components in the metadata services, and the differences in metadata access are predicted to calculate migration probabilities of metadata, thereby improving the accuracy of statistics on migration parameters.

In an optional implementation of the present application, determining the migration parameters corresponding to the respective sub-tree partitions according to the metadata access differences may include the following steps:

Step 1: acquiring a preset maximum metadata throughput.

Step 2: when determining that a historical workload greater than the maximum metadata throughput exists, determining the migration parameters corresponding to the respective sub-tree partitions according to the metadata access differences.

For ease of description, the above two steps may be combined for explanation.

According to the statistical load of each metadata service, not all imbalances require a load re-balancing process. Although the number of input/output operations per second by the load of each metadata service is different, all metadata services are far below their maximum metadata throughput. For example, the maximum number of input/output operations per second by a single metadata service on a single distributed file storage node is preset to 1300. The preset maximum metadata throughput is acquired; and when determining that a historical workload greater than the maximum metadata throughput exists, the migration parameters corresponding to the respective sub-tree partitions are determined according to the metadata access differences. A parameter mds_migration (metadata service migration) can further be introduced to describe the current degree of imbalance. The higher the value, the higher the urgency of the migration. The parameter mds_migration is used for counting the maximum metadata throughput in the same period and comparing the maximum metadata throughput with the theoretical value 1300 within a smoothness range of (0, 1), thereby facilitating the recognition of migration time. By presetting the maximum metadata throughput as a measuring standard of whether to perform the load re-balancing process, the degree and urgency of metadata load imbalance in the distributed file storage cluster can be accurately determined, and the probability of unnecessary metadata migration can be reduced.

S304: determining exporter sub-tree partitions and importer sub-tree partitions according to the migration parameters through sub-tree selection components deployed in the metadata services.

As shown in FIG. 4, the load-aware migration planning module pre-deployed in each metadata service further includes the sub-tree selection component, and the exporter sub-tree partitions and the importer sub-tree partitions are determined according to the migration parameters through the sub-tree selection components deployed in the metadata services. A group of appropriate sub-tree partitions are selected through the sub-tree selection component for migration.

In an optional implementation of the present application, step S303 may include the following step:

acquiring the migration parameters corresponding to the respective sub-tree partitions in the target metadata services and a workload I/O mode of the distributed file storage cluster through the load analysis components deployed in the metadata services.

Correspondingly, step S304 may include the following step:

when determining that the workload I/O mode is metadata intensive IO, determining the exporter sub-tree partitions and the importer sub-tree partitions according to the migration parameters through the sub-tree selection components deployed in the metadata services.

The migration parameters corresponding to the respective sub-tree partitions in the target metadata services and the workload I/O mode of the distributed file storage cluster are acquired through the load analysis components deployed in the metadata services; and when determining that the workload I/O mode is metadata intensive IO, for example, for a machine learning or modeling service with metadata requests accounting for more than 70%, its service features span 1.8 million small files in 1000 directories, with an average size of 15 KB, the exporter sub-tree partitions and the importer sub-tree partitions are determined according to the migration parameters through the sub-tree selection components deployed in the metadata services. Whether to perform the load re-balancing process is determined by combining the migration parameters corresponding to the respective sub-tree partitions and the workload I/O mode of the distributed file storage cluster, thereby reducing the probability of unnecessary metadata migration.

S305: migrating the metadata in the quantity of to-be-migrated metadata from the exporter sub-tree partitions to the importer sub-tree partitions when the metadata migration time arrives.

When the metadata migration time arrives, the metadata in the quantity of to-be-migrated metadata is migrated from the exporter sub-tree partitions to the importer sub-tree partitions. The present application has good metadata load balance, effectively increases the metadata throughput, and eliminates the performance bottleneck caused by metadata in high-concurrency metadata intensive file system services. In addition, the present application has shorter metadata response time, can handle metadata cluster expansion and client workload growth, and improves the linear scalability of the distributed cluster.

Corresponding to the above method embodiments, the present application further provides a metadata load balancing apparatus. The metadata load balancing apparatus described below can be referenced to the metadata load balancing method described above.

Figure 5:
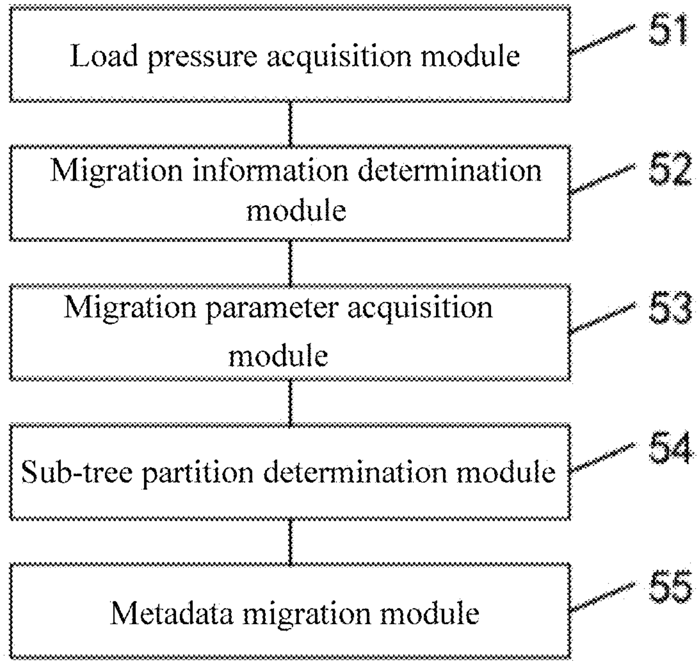
FIG. 5 is a structural block diagram of a metadata load balancing apparatus according to an embodiment of the present application.

Refer to FIG. 5. FIG. 5 is a structural block diagram of a metadata load balancing apparatus according to an embodiment of the present application. The apparatus may include:

a load pressure acquisition module 51, configured to acquire metadata load pressure information corresponding to respective metadata services in a distributed file storage cluster;

a migration information determination module 52, configured to determine a metadata migration time, target metadata services scheduled for metadata migration, and a quantity of to-be-migrated metadata between the target metadata services according to the metadata load pressure information;

a migration parameter acquisition module 53, configured to acquire migration parameters corresponding to respective sub-tree partitions in the target metadata services;

a sub-tree partition determination module 54, configured to determine exporter sub-tree partitions and importer sub-tree partitions according to the migration parameters; and a metadata migration module 55, configured to migrate metadata in the quantity of to-be-migrated metadata from the exporter sub-tree partitions to the importer sub-tree partitions when the metadata migration time arrives.

As can be seen from the above technical solution, the metadata migration time, the target metadata services scheduled for metadata migration, and the quantity of to-be-migrated metadata between the target metadata services are accurately determined according to the acquired metadata load pressure information corresponding to the respective metadata services, and the exporter sub-tree partitions and the importer sub-tree partitions are accurately determined according to the migration parameters corresponding to the respective sub-tree partitions in the target metadata services, thereby achieving accurate migration of metadata, improving the recognition of service load characteristics, greatly reducing the probability of unnecessary and invalid migration of metadata, effectively increasing metadata throughput, eliminating the performance bottleneck caused by metadata in high-concurrency metadata intensive file system services, achieving good metadata load balancing characteristics, and improving the stability of a distributed storage system.

In an optional implementation of the present application, the load pressure acquisition module 51 may be a module that acquires the metadata load pressure information corresponding to respective metadata services through load monitors deployed in the metadata services of the distributed file storage cluster.

In an optional implementation of the present application, the migration information determination module 55 may be a module that determines the metadata migration time, the target metadata services scheduled for metadata migration, and the quantity of to-be-migrated metadata between the target metadata services according to the metadata load pressure information through a metadata migration initiator set in a pre-selected metadata service.

In an optional implementation of the present application, the migration parameter acquisition module 53 may be a module that acquires the migration parameters corresponding to the respective sub-tree partitions in the target metadata services through load analysis components deployed in the metadata services.

The sub-tree partition determination module 54 may be optionally a module that determines the exporter sub-tree partitions and the importer sub-tree partitions according to the migration parameters through sub-tree selection components deployed in the metadata services.

In an optional implementation of the present application, the migration parameter acquisition module 53 may be a module that acquires the migration parameters corresponding to the respective sub-tree partitions in the target metadata services and a workload I/O mode of the distributed file storage cluster through the load analysis components deployed in the metadata services;

The sub-tree partition determination module 54 may be a module that determines the exporter sub-tree partitions and the importer sub-tree partitions according to the migration parameters through the sub-tree selection components deployed in the metadata services when determining that the workload I/O mode is metadata intensive IO.

In an optional implementation of the present application, the migration parameter acquisition module 53 includes:

a historical workload statistics sub-module, configured to count historical workloads corresponding to the respective sub-tree partitions through the load analysis components deployed in the metadata services;

a metadata access difference determination sub-module, configured to determine metadata access differences of the sub-tree partitions according to the historical workloads; and a migration parameter determination sub-module, configured to determine the migration parameters corresponding to the respective sub-tree partitions according to the metadata access differences.

In an optional implementation of the present application, the migration parameter determination sub-module includes:

a maximum metadata throughput acquisition unit, configured to acquire a preset maximum metadata throughput; and a migration parameter determination unit, configured to determine the migration parameters corresponding to the respective sub-tree partitions according to the metadata access differences when determining that a historical workload greater than the maximum metadata throughput exists.

In an optional implementation of the present application, the apparatus may further include:

a sub-tree partition selection module, configured to select target sub-tree partitions from the sub-tree partitions at same levels as the exporter sub-tree partitions after the exporter sub-tree partitions and the importer sub-tree partitions are determined according to the migration parameters and when a historical metadata access request table that reflects spatial locality exists among historical metadata access request tables maintained in the metadata services; and a migration parameter increase module, configured to increase the migration parameters of the target sub-tree partitions by a preset value.

In an optional implementation of the present application, the load pressure acquisition module 51 includes:

a metadata request number acquisition sub-module, configured to acquire the number of metadata requests processed per unit duration corresponding to the respective metadata services in the distributed file storage cluster; and a load pressure determination sub-module, configured to determine the metadata load pressure information corresponding to the respective metadata services according to the number of metadata requests processed per unit duration corresponding to the respective metadata services.

In an optional implementation of the present application, the load pressure determination sub-module may be a module that determines the metadata load pressure information corresponding to the respective metadata services according to the statistical number of metadata requests processed per unit duration corresponding to the respective metadata services within a preset duration.

In an optional implementation of the present application, the migration information determination module 52 includes:

a load balance value determination sub-module, configured to determine metadata load balance values corresponding to the respective metadata services according to the metadata load pressure information; and a migration information determination sub-module, configured to determine the metadata migration time, the target metadata services scheduled for metadata migration, and the quantity of to-be-migrated metadata between the target metadata services according to the metadata load balance values.

In an optional implementation of the present application, the migration information determination sub-module includes:

a determination unit, configured to determine whether a metadata load balance value that exceeds a preset threshold exists; and a migration information determination unit, configured to determine the metadata migration time, the target metadata services scheduled for metadata migration, and the quantity of to-be-migrated metadata between the target metadata services according to the metadata load balance values when determining that the metadata load balance value that exceeds the preset threshold exists.

In an optional implementation of the present application, the migration information determination module 52 includes:

a load difference acquisition sub-module, configured to obtain load differences that the respective metadata services tolerate; and a migration information determination sub-module, configured to determine the metadata migration time, the target metadata services scheduled for metadata migration, and the quantity of to-be-migrated metadata between the target metadata services by combining the metadata load pressure information and the load differences.

In an optional implementation of the present application, the load pressure acquisition module 51 includes:

a number of input/output operations acquisition sub-module, configured to acquire the number of input/output operations per second performed by the metadata services in the distributed file storage cluster, respectively; and a load pressure determination sub-module, configured to determine the metadata load pressure information corresponding to the respective metadata services according to the number of input/output operations per second performed by the metadata services.

In an optional implementation of the present application, the sub-tree partition determination module includes:

a sub-tree partition sorting sub-module, configured to sort the sub-tree partitions according to the migration parameters to obtain sorting results; and a sub-tree partition selection sub-module, configured to select, according to the sorting results, a first preset quantity of sub-tree partitions from an end with large migration parameters as the exporter sub-tree partitions, and a second preset quantity of sub-tree partitions from an end with small migration parameters as the importer sub-tree partitions.

In an optional implementation of the present application, the apparatus may further include:

an invalid migration candidate determination module, configured to determine remaining sub-tree partitions, except for the exporter sub-tree partitions, as invalid migration candidates after the first preset quantity of sub-tree partitions are selected from the end with large migration parameters according to the sorting results as the exporter sub-tree partitions.

In an optional implementation of the present application, the sub-tree partition selection sub-module includes:

a sub-tree partition quantity statistics unit, configured to count a quantity of sub-tree partitions with spare capacities greater than or equal to a preset capacity value among the sub-tree partitions;

a first importer sub-tree partition selection unit, configured to select the second preset quantity of sub-tree partitions from the end with small migration parameters as the importer sub-tree partitions when the quantity of sub-tree partitions with spare capacities greater than or equal to the preset capacity value is greater than or equal to the second preset quantity; and a second importer sub-tree partition selection unit, configured to determine the sub-tree partitions with spare capacities greater than or equal to the preset capacity value as the importer sub-tree partitions when the quantity of sub-tree partitions with spare capacities greater than or equal to the preset capacity value is less than the second preset quantity.

Figure 6:
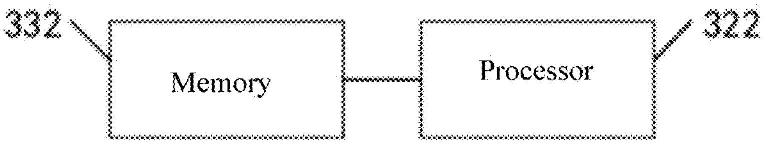
FIG. 6 is a structural block diagram of a metadata load balancing device according to an embodiment of the present application.

Corresponding to the above method embodiment, refer to FIG. 6. FIG. 6 is a schematic diagram of a metadata load balancing device provided in the present application. The device may include:

a memory 332, configured to store a computer program; and a processor 322, configured to implement the steps of the metadata load balancing method in the above method embodiments when executing the computer program.

Figure 7:
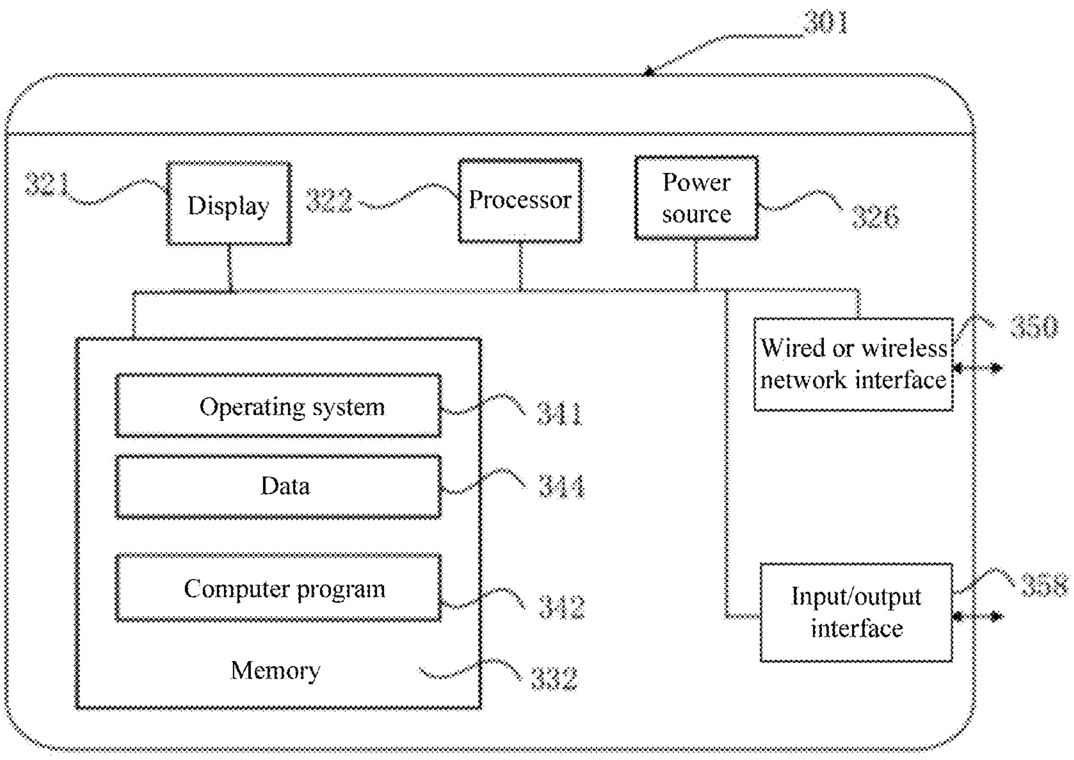
FIG. 7 is a schematic diagram of an optional structure of a metadata load balancing device provided in an embodiment.

In some embodiments, refer to FIG. 7. FIG. 7 is a schematic diagram of an optional structure of a metadata load balancing device provided in an embodiment. The metadata load balancing device may vary greatly due to different configuration or performance, and may include a central processing unit (CPU) 322 (such as one or more processors) and a memory 332. The memory 332 stores one or more computer programs 342 or data 344. The memory 332 can be a transient storage or a persistent storage. The program stored in the memory 332 may include one or more modules (not shown), and each module may include a series of instruction operations in the data processing device. In some embodiments, the processor 322 may be configured to communicate with the memory 332 and perform a series of instruction operations in the memory 332 on the metadata load balancing device 301.

The metadata load balancing device 301 may further include one or more power sources 326, one or more wired or wireless network interfaces 350, one or more input/output interfaces 358, and/or one or more operating systems 341.

The steps in the metadata load balancing method described above can be implemented by the structure of the metadata load balancing device.

Corresponding to the above method embodiments, the present application further provides a computer non-volatile readable storage medium, storing a computer program that, when executed by a processor, can implement the following steps:

acquiring metadata load pressure information corresponding to respective metadata services in a distributed file storage cluster; determining a metadata migration time, target metadata services scheduled for metadata migration, and a quantity of to-be-migrated metadata between the target metadata services according to the metadata load pressure information; acquiring migration parameters corresponding to respective sub-tree partitions in the target metadata services; determining exporter sub-tree partitions and importer sub-tree partitions according to the migration parameters; and migrating metadata in the quantity of to-be-migrated metadata from the exporter sub-tree partitions to the importer sub-tree partitions when the metadata migration time arrives.

The computer non-volatile readable storage medium may include various non-volatile readable storage media that can store program code, such as USB flash drives, portable hard drives, read-only memories (ROMs), random access memories (RAMs), magnetic disks, or optical disks.

The introduction of the computer non-volatile readable storage medium provided in the present application is referenced to the above method embodiments, and the present application will not provide repeated description here.

The embodiments in the description are described in a progressive manner, each embodiment focuses on differences from other embodiments, and reference may be made to the same or similar parts of the embodiments. The apparatus, device, and computer non-volatile readable storage medium disclosed in the embodiments, corresponding to the method disclosed in the embodiments, are described relatively simply, and relevant parts may be referenced to the descriptions of the method.

Optional examples are used above to explain the principles and implementations of the present application. The above embodiments are described only to help understand the technical solutions and core ideas of the present application. It should be pointed out that, for those of ordinary skill in the technical field, improvements and modifications can be made to the present application without departing from the principles of the present application, and these improvements and modifications also fall within the scope of protection of the claims of the present application.

What is claimed is:

1. A metadata load balancing method, comprising:

acquiring metadata load pressure information corresponding to respective metadata services in a distributed file storage cluster, wherein the acquiring metadata load pressure information corresponding to respective metadata services in a distributed file storage cluster comprises: acquiring a number of metadata requests processed per unit duration corresponding to the respective metadata services in the distributed file storage cluster, determining the metadata load pressure information corresponding to the respective metadata services according to a statistical number of metadata requests processed per unit duration corresponding to the respective metadata services within a preset duration;

determining a metadata migration time, target metadata services scheduled for metadata migration, and a quantity of to-be-migrated metadata between the target metadata services according to the metadata load pressure information, wherein the determining a metadata migration time, target metadata services scheduled for metadata migration, and a quantity of to-be-migrated metadata between the target metadata services according to the metadata load pressure information comprises: obtaining load differences that the respective metadata services tolerate; and determining the metadata migration time, the target metadata services scheduled for metadata migration, and the quantity of to-be-migrated metadata between the target metadata services by combining the metadata load pressure information and the load differences;

acquiring migration parameters corresponding to respective sub-tree partitions in the target metadata services and a workload input/output (I/O) mode of the distributed file storage cluster through load analysis components deployed in the metadata services, wherein the sub-tree partitions are continuous sub-directories decomposed from a directory of a distributed file system, wherein the acquiring migration parameters corresponding to respective sub-tree partitions in the target metadata services through load analysis components deployed in the metadata services comprises: collecting statistics on historical workloads corresponding to the respective sub-tree partitions through the load analysis components deployed in the metadata services; determining metadata access differences of the sub-tree partitions according to the historical workloads; acquiring a preset maximum metadata throughput; and when determining that a historical workload greater than the preset maximum metadata throughput exists, determining the migration parameters corresponding to the respective sub-tree partitions according to the metadata access differences;

when determining that the workload I/O mode is metadata intensive I/O, determining exporter sub-tree partitions and importer sub-tree partitions according to the migration parameters through sub-tree selection components deployed in the metadata services; and migrating metadata in the quantity of to-be-migrated metadata from the exporter sub-tree partitions to the importer sub-tree partitions when the metadata migration time arrives.

2. The metadata load balancing method according to claim 1, wherein the acquiring metadata load pressure information corresponding to respective metadata services in a distributed file storage cluster comprises:

acquiring the metadata load pressure information corresponding to the respective metadata services through load monitors deployed in the metadata services of the distributed file storage cluster.

3. The metadata load balancing method according to claim 1, wherein the determining a metadata migration time, target metadata services scheduled for metadata migration, and a quantity of to-be-migrated metadata between the target metadata services according to the metadata load pressure information comprises:

determining the metadata migration time, the target metadata services scheduled for metadata migration, and the quantity of to-be-migrated metadata between the target metadata services according to the metadata load pressure information through a metadata migration initiator set in a pre-selected metadata service.

4. The metadata load balancing method according to claim 1, wherein after the determining exporter sub-tree partitions and importer sub-tree partitions according to the migration parameters, the metadata load balancing method further comprises:

when a historical metadata access request table that reflects spatial locality exists among historical metadata access request tables maintained in the metadata services, selecting target sub-tree partitions from the sub-tree partitions at same levels as the exporter sub-tree partitions; and increasing the migration parameters of the target sub-tree partitions by a preset value.

5. The metadata load balancing method according to claim 1, wherein the determining a metadata migration time, target metadata services scheduled for metadata migration, and a quantity of to-be-migrated metadata between the target metadata services according to the metadata load pressure information comprises:

determining metadata load balance values corresponding to the respective metadata services according to the metadata load pressure information; and determining the metadata migration time, the target metadata services scheduled for metadata migration, and the quantity of to-be-migrated metadata between the target metadata services according to the metadata load balance values.

6. The metadata load balancing method according to claim 5, wherein the determining the metadata migration time, the target metadata services scheduled for metadata migration, and the quantity of to-be-migrated metadata between the target metadata services according to the metadata load balance values comprises:

determining whether a metadata load balance value of the metadata load balance values that exceeds a preset threshold exists; and when the metadata load balance value that exceeds the preset threshold exists, performing the determining the metadata migration time, the target metadata services scheduled for metadata migration, and the quantity of to-be-migrated metadata between the target metadata services according to the metadata load balance values.

7. The metadata load balancing method according to claim 1, wherein the acquiring metadata load pressure information corresponding to respective metadata services in a distributed file storage cluster comprises:

acquiring a number of input/output operations per second performed by the metadata services in the distributed file storage cluster, respectively; and determining the metadata load pressure information corresponding to the respective metadata services according to the number of input/output operations per second performed by the metadata services.

8. The metadata load balancing method according to claim 1, wherein the determining exporter sub-tree partitions and importer sub-tree partitions according to the migration parameters comprises:

sorting the sub-tree partitions according to the migration parameters to obtain sorting results; and selecting, according to the sorting results, a first preset quantity of sub-tree partitions from an end with large migration parameters as the exporter sub-tree partitions, and a second preset quantity of sub-tree partitions from an end with small migration parameters as the importer sub-tree partitions.

9. The metadata load balancing method according to claim 8, wherein after the selecting, according to the sorting results, a first preset quantity of sub-tree partitions from an end with large migration parameters as the exporter sub-tree partitions, the metadata load balancing method further comprises:

determining remaining sub-tree partitions, except for the exporter sub-tree partitions, as invalid migration candidates.

10. The metadata load balancing method according to claim 8, wherein the selecting a second preset quantity of sub-tree partitions from an end with small migration parameters as the importer sub-tree partitions comprises:

counting a quantity of sub-tree partitions with spare capacities greater than or equal to a preset capacity value among the sub-tree partitions;

when the quantity of sub-tree partitions with spare capacities greater than or equal to the preset capacity value is greater than or equal to the second preset quantity, selecting the second preset quantity of sub-tree partitions from the end with small migration parameters as the importer sub-tree partitions; and when the quantity of sub-tree partitions with spare capacities greater than or equal to the preset capacity value is less than the second preset quantity, determining the sub-tree partitions with spare capacities greater than or equal to the preset capacity value as the importer sub-tree partitions.

11. A metadata load balancing device, comprising:

a memory, configured to store a computer program; and a processor, configured to implement steps of a metadata load balancing method when executing the computer program, comprising:

acquiring metadata load pressure information corresponding to respective metadata services in a distributed file storage cluster, wherein the acquiring metadata load pressure information corresponding to respective metadata services in a distributed file storage cluster comprises: acquiring a number of metadata requests processed per unit duration corresponding to the respective metadata services in the distributed file storage cluster, determining the metadata load pressure information corresponding to the respective metadata services according to a statistical number of metadata requests processed per unit duration corresponding to the respective metadata services within a preset duration;

determining a metadata migration time, target metadata services scheduled for metadata migration, and a quantity of to-be-migrated metadata between the target metadata services according to the metadata load pressure information, wherein the determining a metadata migration time, target metadata services scheduled for metadata migration, and a quantity of to-be-migrated metadata between the target metadata services according to the metadata load pressure information comprises: obtaining load differences that the respective metadata services tolerate; and determining the metadata migration time, the target metadata services scheduled for metadata migration, and the quantity of to-be-migrated metadata between the target metadata services by combining the metadata load pressure information and the load differences;

acquiring migration parameters corresponding to respective sub-tree partitions in the target metadata services and a workload input/output (I/O) mode of the distributed file storage cluster through load analysis components deployed in the metadata services, wherein the sub-tree partitions are continuous sub-directories decomposed from a directory of a distributed file system, wherein the acquiring migration parameters corresponding to respective sub-tree partitions in the target metadata services through load analysis components deployed in the metadata services comprises: collecting statistics on historical workloads corresponding to the respective sub-tree partitions through the load analysis components deployed in the metadata services; determining metadata access differences of the sub-tree partitions according to the historical workloads; acquiring a preset maximum metadata throughput; and when determining that a historical workload greater than the preset maximum metadata throughput exists, determining the migration parameters corresponding to the respective sub-tree partitions according to the metadata access differences;

when determining that the workload I/O mode is metadata intensive I/O, determining exporter sub-tree partitions and importer sub-tree partitions according to the migration parameters through sub-tree selection components deployed in the metadata services; and migrating metadata in the quantity of to-be-migrated metadata from the exporter sub-tree partitions to the importer sub-tree partitions when the metadata migration time arrives.

12. A computer non-transitory readable storage medium, wherein the computer non-volatile readable storage medium stores a computer program that, when executed by a processor, implements steps of a metadata load balancing method comprising:

acquiring metadata load pressure information corresponding to respective metadata services in a distributed file storage cluster, wherein the acquiring metadata load pressure information corresponding to respective metadata services in a distributed file storage cluster comprises: acquiring a number of metadata requests processed per unit duration corresponding to the respective metadata services in the distributed file storage cluster, determining the metadata load pressure information corresponding to the respective metadata services according to a statistical number of metadata requests processed per unit duration corresponding to the respective metadata services within a preset duration;

determining a metadata migration time, target metadata services scheduled for metadata migration, and a quantity of to-be-migrated metadata between the target metadata services according to the metadata load pressure information, wherein the determining a metadata migration time, target metadata services scheduled for metadata migration, and a quantity of to-be-migrated metadata between the target metadata services according to the metadata load pressure information comprises: obtaining load differences that the respective metadata services tolerate; and determining the metadata migration time, the target metadata services scheduled for metadata migration, and the quantity of to-be-migrated metadata between the target metadata services by combining the metadata load pressure information and the load differences;

acquiring migration parameters corresponding to respective sub-tree partitions in the target metadata services and a workload input/output (I/O) mode of the distributed file storage cluster through load analysis components deployed in the metadata services, wherein the sub-tree partitions are continuous sub-directories decomposed from a directory of a distributed file system, wherein the acquiring migration parameters corresponding to respective sub-tree partitions in the target metadata services through load analysis components deployed in the metadata services comprises: collecting statistics on historical workloads corresponding to the respective sub-tree partitions through the load analysis components deployed in the metadata services; determining metadata access differences of the sub-tree partitions according to the historical workloads; acquiring a preset maximum metadata throughput; and when determining that a historical workload greater than the preset maximum metadata throughput exists, determining the migration parameters corresponding to the respective sub-tree partitions according to the metadata access differences;

when determining that the workload I/O mode is metadata intensive I/O, determining exporter sub-tree partitions and importer sub-tree partitions according to the migration parameters through sub-tree selection components deployed in the metadata services; and migrating metadata in the quantity of to-be-migrated metadata from the exporter sub-tree partitions to the importer sub-tree partitions when the metadata migration time arrives.

13. The metadata load balancing device according to claim 11, wherein the processor is further configured to implement a step of:

acquiring the metadata load pressure information corresponding to the respective metadata services through load monitors deployed in the metadata services of the distributed file storage cluster.

14. The metadata load balancing device according to claim 11, wherein the processor is further configured to implement a step of:

determining the metadata migration time, the target metadata services scheduled for metadata migration, and the quantity of to-be-migrated metadata between the target metadata services according to the metadata load pressure information through a metadata migration initiator set in a pre-selected metadata service.

* * * * *